US008649612B1

(12) United States Patent
Brunner

(10) Patent No.: US 8,649,612 B1
(45) Date of Patent: Feb. 11, 2014

(54) PARALLELIZING CASCADED FACE DETECTION

(75) Inventor: Ralph Brunner, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 630 days.

(21) Appl. No.: 12/693,204

(22) Filed: Jan. 25, 2010

Related U.S. Application Data

(60) Provisional application No. 61/292,795, filed on Jan. 6, 2010.

(51) Int. Cl.
*G06K 9/00* (2006.01)

(52) U.S. Cl.
USPC ............................. 382/224; 382/118; 382/172

(58) Field of Classification Search
USPC ......... 382/103, 115, 224, 118, 254, 274, 154,
382/203, 276, 172, 304, 218, 283, 284;
348/16, 152, 169, 207.99, 68, 77–78,
348/143, 155, 158, 220.1, 229.1; 345/419,
345/426, 473; 703/2
See application file for complete search history.

(56) References Cited

U.S. PATENT DOCUMENTS

| 5,473,709 | A | 12/1995 | Aoki |
| 5,748,197 | A | 5/1998 | Guibas et al. |
| 5,751,852 | A | 5/1998 | Marimont et al. |
| 5,781,650 | A | 7/1998 | Lobo et al. |
| 6,148,092 | A | 11/2000 | Qian |
| 7,227,977 | B1 * | 6/2007 | Dotsenko ...................... 382/118 |
| 7,333,648 | B2 | 2/2008 | Edic et al. |
| 7,551,173 | B2 | 6/2009 | Cao |
| 7,587,068 | B1 | 9/2009 | Steinberg et al. |
| 2003/0007685 | A1 | 1/2003 | Tsai et al. |
| 2007/0172099 | A1 | 7/2007 | Park et al. |
| 2008/0144892 | A1 | 6/2008 | Lu et al. |
| 2008/0205712 | A1 | 8/2008 | Ionita et al. |
| 2010/0030578 | A1 | 2/2010 | Siddique et al. |
| 2010/0145898 | A1 | 6/2010 | Malfliet et al. |

FOREIGN PATENT DOCUMENTS

EP 1499110 A3 3/2006

OTHER PUBLICATIONS

Tsapatsoulis et al; "Facial Image Indexing in Multimedia Databases"; Pattern Analysis & Applications; 2001; 4:93-107.
Ming-Hsuan Yang; "Recent Advances in Face Detection"; Honda Research Institute; ICPR 2004; pp. 1-93; Mountain View, California, USA.
Luminance Adjusted Face Detection; Fish & Richardson; U.S. Appl. No. 12/912,620, filed Oct. 26, 2010, 37 pages.

(Continued)

*Primary Examiner* — Sheela Chawan
(74) *Attorney, Agent, or Firm* — Wong, Cabello, Lutsch, Rutherford & Brucculeri, LLP

(57) ABSTRACT

One or more portions of a cascaded face detection process, such as a process using a number of stages in which each stage includes classifiers having one or more associated features, can be parallelized. For instance, multiple pixels associated with an image can be evaluated in parallel, including simultaneously evaluating one or more features for each of the selected pixels. As a result, the number of operations required to perform the face detection processing can be reduced. Further, pre-processing can be performed to identify one or more image regions for which face detection process need not be performed. For instance, either or both of a skin-tone measure and a variance measure can be used to identify image regions in which a face is unlikely to be depicted.

18 Claims, 9 Drawing Sheets

(56) References Cited

OTHER PUBLICATIONS

Yang et al; "Detecting Faces in Images: A Survey"; IEEE Transactions on Pattern Analysis and Machine Intelligence; Jan. 2002; vol. 24, No. 1, pp. 34-58.

Hjelmas et al; "Face Detection: A Survey"; Computer Vision and Image Understanding 83; 2001; pp. 236-274; Academic Press.

Yun et al; "Local Normalization with Optimal Adaptive Correlation for Automatic and Robust Face Detection on Video Sequences"; Tenth IEEE International Symposium on Multimedia; 2008; pp. 160-165.

Viola et al; "Robust Real-time Object Detection"; Second International Workshop on Statistical and Computational Theories of Vision—Modeling, Learning, Computing, and Sampling; Jul. 13, 2001; pp. 1-25; Vancouver, Canada.

Feature Scaling for Face Detection; Fish & Richardson; U.S. Appl. No. 12/693,179, filed Jan. 25, 2010; 23 pages.

* cited by examiner

PARALLELIZING CASCADED FACE DETECTION

PRIORITY CLAIM AND RELATED APPLICATIONS

This patent document claims priority from U.S. Provisional Application No. 61/292,795 entitled "Parallelizing Cascaded Face Detection" and filed Jan. 6, 2010, which is incorporated by reference as part of the disclosure of this document.

TECHNICAL FIELD

The present disclosure relates to analyzing and processing digital image data to identify image regions depicting faces, and to performing face detection processing for multiple features in parallel.

BACKGROUND

Digital images are being used in increasingly more applications. In many of those applications, automated analysis of digital images can be performed to provide either or both of face detection and face recognition. In face detection, an image region depicting a face is identified. In face recognition, a detected face is associated with a known individual. Face detection and face recognition can be used for a wide variety of tasks, including image enhancement, content-based retrieval, automatic identification, and image database management. For instance, in image processing applications, face detection can be used to automatically perform enhancements, such as red-eye correction and contrast adjustment. Further, face recognition can be used in conjunction with search applications retrieve images that depict a particular individual.

Numerous approaches to face detection have been developed, including neural networks, skin-tone techniques, eigenface/eigenvector, and clustering. A neural network can be trained to locate faces in digital images using one or more training sets that include face images and non-face images. The performance of a neural network will depend on its training. Skin-tone techniques utilize color-based analysis to identify regions in a digital image that primarily consist of colors associated with a predetermined skin-tone color space. Eigenface or eigenvector processing relies on determining a standardized face based on the statistical analysis of a large number of faces and analyzing digital images with respect to the eigenface. Clustering operates to identify clusters of face-data within which variance is low and non-face data regions that have high-variance from the face-data. These approaches require significant processing and thus typically do not provide real-time face detection.

Real-time face detection algorithms also have been developed, such as the Viola-Jones algorithm. The Viola-Jones algorithm searches pixel sub-windows of a candidate window using multiple classifiers, with each classifier configured to select particular visual features from a set of possible visual features. The features used by the Viola-Jones detection framework are characterized as rectangular areas. Different types of features can be defined, including both horizontal and vertical features. The value of a feature is computed by subtracting the sum of the image pixels in one or more feature regions from the sum of the image pixels in one or more other feature regions. The sum of the image pixels within a feature region (or contrast region) can be computed based on an integral image, which is computed from an original image being evaluated. Further, the classifiers are grouped in stages, which are cascaded. As a result, only sub-windows that pass the classifiers of the current stage are submitted for further analysis to the classifiers of a subsequent stage. Thus, at least some of the sub-windows that do not represent face data can be discarded early in the analysis.

SUMMARY

One or more portions of a cascaded face detection process can be performed in parallel. For instance, multiple face locations can be selected for analysis and one or more features can be simultaneously evaluated for each of the selected face locations. Also, the face locations can be selected to correspond to one of multiple face sizes. The present inventor recognized the need to reduce the number of operations performed during face detection processing. Further, the present inventor recognized that neighboring pixels can follow substantially the same path through a face detection process. The present inventor also recognized that by parallelizing the evaluation of neighboring pixels, operations such as retrieving values could be combined.

Further, the present inventor recognized that a skin-tone measure could be evaluated to identify one or more image regions unlikely to include a face. The present inventor also recognized that a variance measure could be evaluated to identify one or more image regions for which the contrast is so low that the region also is unlikely to include a face. The present inventor recognized that either or both measures could be evaluated prior to face detection processing to reduce the number of image regions that need to be evaluated.

In general, in one aspect, the techniques can be implemented to include selecting, using a processor, a plurality of locations corresponding to an image; determining, for each selected location in parallel, a classifier score for each of a plurality of classifiers associated with an analysis stage; summing, for each selected location, the classifier scores to generate a total classifier score associated with the analysis stage; comparing the total classifier score to a threshold; and generating, responsive to the comparing, a classifier mask for the analysis stage, wherein the classifier mask includes a zero value corresponding to each location for which the total classifier score compares to the threshold in a predetermined manner.

Further, the techniques can be implemented in accordance with one or more of the following. The techniques can be implemented such that the image is an integral image. The techniques also can be implemented to include evaluating the image, prior to selecting a plurality of locations, to identify at least one region for which face detection processing is not to be performed. Additionally, the techniques can be implemented such that evaluating the image further includes determining a variance factor corresponding to an area in the image; comparing the determined variance factor to a predetermined variance factor threshold; and determining that facial detection processing should not be performed for the location in the image if the determined variance factor compares with the predetermined variance factor threshold in a predetermined manner.

The techniques also can be implemented such that the variance factor is computed using the equation variance/mean-squared. Further, the techniques can be implemented such that a classifier includes two features. Additionally, the techniques can be implemented to include providing the classifier mask as an input to a subsequent analysis stage.

In general, in another aspect, the techniques can be implemented as a computer-readable storage device tangibly embodying a computer program including instructions that, when executed by a processing apparatus, cause the processing apparatus to perform operations including selecting a plurality of locations corresponding to an image; determining, for each selected location in parallel, a classifier score for each of a plurality of classifiers associated with an analysis stage; summing, for each selected location, the classifier scores to generate a total classifier score associated with the analysis stage; comparing the total classifier score to a classifier threshold; and generating, responsive to the comparing, a classifier mask for the analysis stage, wherein the classifier mask includes a zero value corresponding to each location for which the total classifier score compares to the classifier threshold in a predetermined manner.

The techniques also can be implemented to further include instructions that, when executed by a processing apparatus, cause the processing apparatus to perform operations including terminating evaluation of the selected plurality of locations when the classifier mask includes a zero value corresponding to each location. Further, the techniques can be implemented to further include instructions that, when executed by a processing apparatus, cause the processing apparatus to perform operations including determining that the classifier mask includes at least one non-zero value and providing the classifier mask as an input to a subsequent analysis stage. Additionally, the techniques can be implemented to further include instructions that, when executed by a processing apparatus, cause the processing apparatus to perform operations including initiating the subsequent analysis stage in response to the provided classifier mask; generating, for each location in the classifier mask having a non-zero value, a total classifier score for a plurality of classifiers associated with the subsequent analysis stage; comparing the generated total classifier score to a classifier threshold associated with the subsequent analysis stage; and generating, responsive to the comparing, a classifier mask for the subsequent analysis stage, wherein the classifier mask includes a zero value for each location in the provided classifier mask having a zero value and for each location for which the generated total classifier score compares to the classifier threshold associated with the subsequent analysis stage in a predetermined manner.

The techniques also can be implemented to include instructions that, when executed by a processing apparatus, cause the processing apparatus to perform operations including evaluating the image, prior to selecting a plurality of locations, to identify at least one region for which face detection processing is not to be performed. Further, the techniques can be implemented to include instructions that, when executed by a processing apparatus, cause the processing apparatus to perform operations including identifying a number of skin-tone pixels included in a region of the image and determining that face detection processing is not to be performed for the region if the identified number of skin-tone pixels compares with a skin-tone threshold in a predetermined manner. Additionally, the techniques can be implemented to include instructions that, when executed by a processing apparatus, cause the processing apparatus to perform operations including selecting the plurality of locations such that neighboring locations are separated by at least one intervening pixel location. Also, the techniques can be implemented such that the classifier threshold is determined through training.

In general, in another aspect, the techniques can be implemented as a system including a storage device tangibly storing an image and processor electronics configured to perform operations including selecting a plurality of locations corresponding to the image; determining, for each selected location in parallel, a classifier score for each of a plurality of classifiers associated with an analysis stage; summing, for each selected location, the classifier scores to generate a total classifier score associated with the analysis stage; comparing the total classifier score to a classifier threshold; and generating, responsive to the comparing, a classifier mask for the analysis stage, wherein the classifier mask includes a zero value corresponding to each location for which the total classifier score compares to the classifier threshold in a predetermined manner.

The techniques also can be implemented such that the image is an integral image. Further, the techniques can be implemented such that each of the plurality of classifiers associated with the analysis stage includes at least two features. Also, the techniques can be implemented such that the processor electronics are further configured to perform operations including determining that the classifier mask includes at least one non-zero value and providing the classifier mask as an input to a subsequent analysis stage. Additionally, the techniques can be implemented such that the processor electronics are further configured to perform operations including selecting the plurality of locations such that each of the locations is aligned horizontally and neighboring locations are separated by at least one intervening pixel location.

The details of one or more implementations are set forth in the accompanying drawings and the description below. Other features and advantages will be apparent from the description and drawings, and from the claims.

BRIEF DESCRIPTION OF THE DRAWINGS

Like reference symbols indicate like elements throughout the specification and drawings.

DETAILED DESCRIPTION

Figure 1:
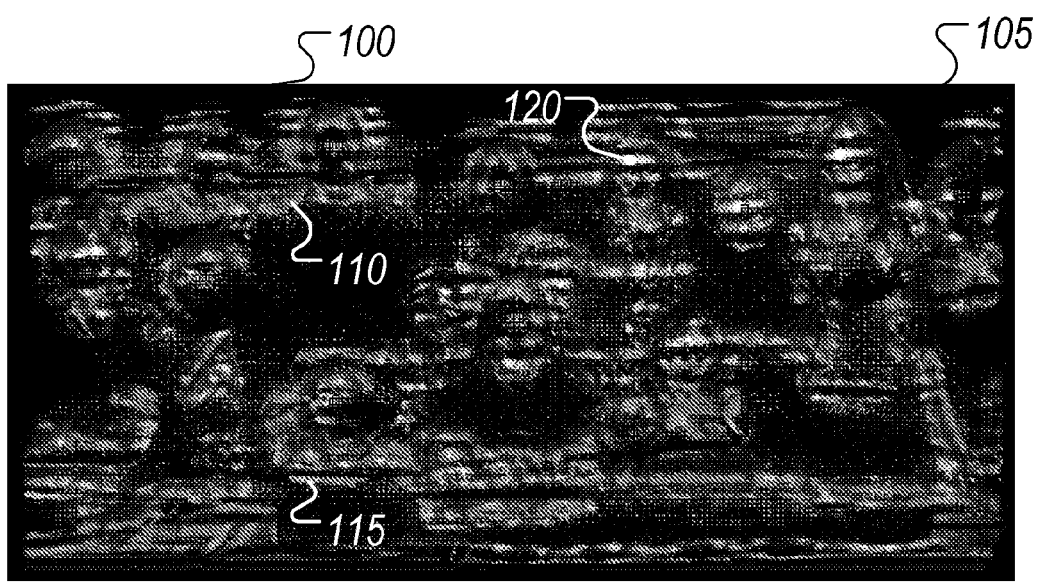
FIG. 1 shows an exemplary image graphically depicting the results of facial detection processing for individual pixel locations.

FIG. 1 shows an exemplary image graphically depicting the results of facial detection processing for individual pixel locations. Image 100 can be a multi-tone image in which a color or gray scale is used to graphically depict the stage of processing at which it was determined that a particular pixel location was not associated with a face. For instance, pixels 105 for which negative results were obtained earliest during the facial detection processing, such as a during a first stage, can be indicated in a first shade, e.g., black and pixels 120 for which positive results were obtained can be indicated in a second shade, e.g., white.

Further, one or more intermediate shades can be used to indicate pixel locations for which negative results were obtained later in processing. For instance, a third shade, e.g., dark gray, can be used to identify pixels 110 for which negative results were obtained during a second stage of processing and a fourth shade, e.g. light gray, can be used to identify pixels 115 for which negative results were obtained during a third stage of processing. One or more stages can be associated with a color or shade, such that the granularity of the graphical depiction can be controlled.

Image 100 indicates that neighboring pixels generally require the same or a similar number of stages to be eliminated from consideration or confirmed as being associated with a face. Thus, facial detection processing can be performed in parallel with respect to neighboring pixels.

Figure 2:
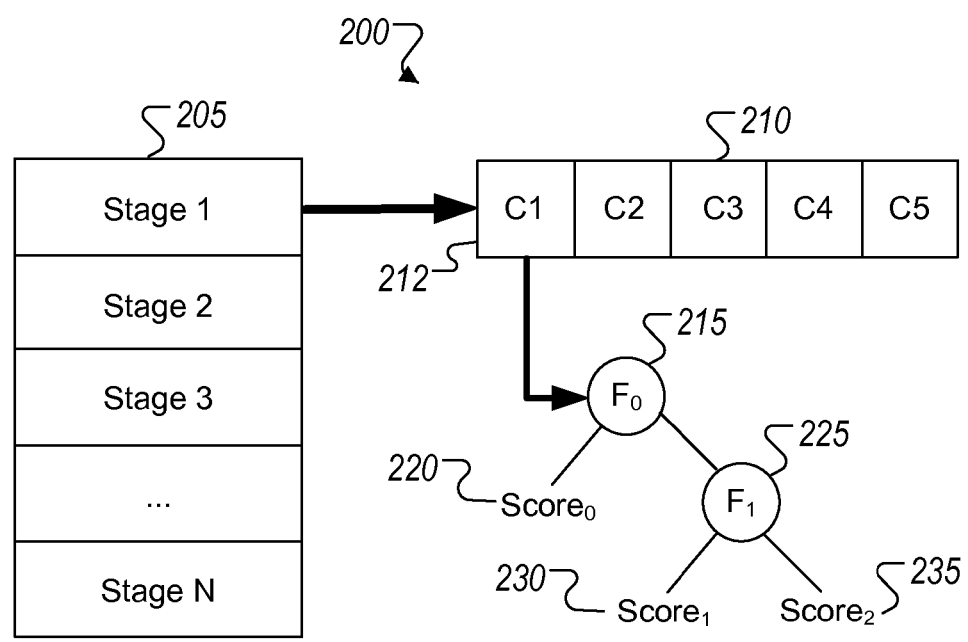
FIG. 2 depicts elements associated with an exemplary facial detection process.

FIG. 2 depicts elements associated with an exemplary facial detection process. Facial detection process 200 can be performed using data associated with an image, such as an integral image generated from an original image. The image data can be evaluated with respect to one or more areas to determine whether a face is detected. In some implementations, one or more areas can be pre-evaluated using other processing, e.g., either or both of variance and skin tone, to identify regions which do not need to be submitted to the facial detection process. Further, in some implementations, the evaluation of two or more image regions can be at least partially performed in parallel. Additionally, in some implementations, only a portion of the pixel locations included in the image can be selected for facial detection processing, such as every other pixel location horizontally and/or vertically.

Facial detection process 200 can include multiple stages 205, e.g. 20 stages. Not all stages need to be performed for each pixel location that is evaluated, since the evaluation of a pixel location can be aborted once it is determined that a face is not present. If multiple pixel locations are processed in parallel, evaluation of the multiple pixel locations can be aborted once it is determined that a face is not associated with any of them. Each of the stages 205 can be configured to provide a particular level of performance. For instance, each stage can be designed to remove a percentage of false positives, e.g. 50 percent, and to retain a percentage of true positives, e.g. 99.9 percent.

Each of the stages 205 can have a corresponding set of classifiers. In order to continue removing the determined percentage of false positives, while retaining the determined percentage of true positives, the number and/or type of classifiers in later stages can be increased. For instance, five classifiers can be included in the set of classifiers corresponding to stage 1. Further, a larger number of classifiers, e.g., 12, can be included in the set of classifiers corresponding to stage 2. Each classifier can include two features, $F_0$ and $F_1$. In some other implementations, each classifier can include a different number of features, or various classifiers can include different numbers of features.

Classifier C1 212 includes $F_0$ 215 and $F_1$ 225. Feature $F_0$ 215 can be evaluated first, such as by computing a feature score for the image region being evaluated. If $F_0$ is present, the classifier score equals $Score_0$ 220. If $F_0$ is not present, $F_1$ is evaluated for the same image region. If $F_1$ is present, the classifier score equals $Score_1$ 230, otherwise the classifier score equals $Score_2$ 235. The classifier scores corresponding to a stage can then be compared to a threshold to determine whether evaluation of the corresponding pixel location can be aborted or can advance to the next stage. In some implementations, the threshold can be established through training, such as by processing one or more libraries of test images. If multiple pixel locations are analyzed in parallel, all of the pixel locations can be passed to the next stage if any one of the locations is to be advanced. However, only the pixel location or locations that passed the previous stage are evaluated, the remaining locations can be ignored.

Figure 3:
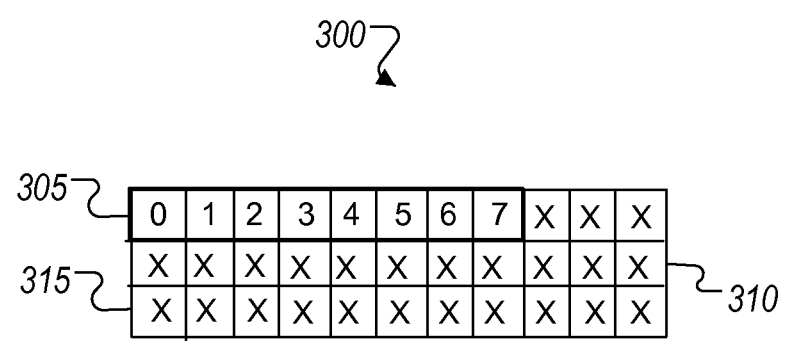
FIG. 3 shows locations in an exemplary partial image.

FIG. 3 shows locations in an exemplary partial image. Image 300, which is partially depicted, can be an integral image derived from another image, such as an original image. Since neighboring (or adjacent) locations in an image can have the same path or similar paths through a facial detection process, the evaluation of neighboring locations can be parallelized. Any number of locations, e.g. 2, 4, or 8, can be processed in parallel. Window 305 shows the selection of 8 locations, e.g. pixels, numbered 0 to 7, from image 300. Each location can indicate a candidate face rectangle to be evaluated. For example, a location can be the origin of a face rectangle. The locations included in window 305 can be submitted together to a facial detection process. Further, one or more of the locations in window 305 can be discarded, such that only a subset of the locations need to be evaluated during facial detection processing. For instance, locations 0, 2, 4, and 6 can be evaluated, while locations 1, 3, 5, and 7 can be ignored. In some implementations, values corresponding to multiple locations can be read as a vector in a single access. Further, values in the vector that correspond to skipped locations can be discarded.

In addition to skipping locations horizontally, one or more locations also can be skipped vertically. For instance, additional locations can be selected from row 315, while all of the locations in intervening row 310 can be skipped. Thus, a subset of the locations in image 300 can be selected for facial detection processing. With respect to facial detection processing, each selected location can serve as the origin for the application of one or more features, such as a 16 pixel×4 pixel feature. Thus, overlapping portions of image 300 are evaluated, even when one or more locations are skipped.

Figure 4:
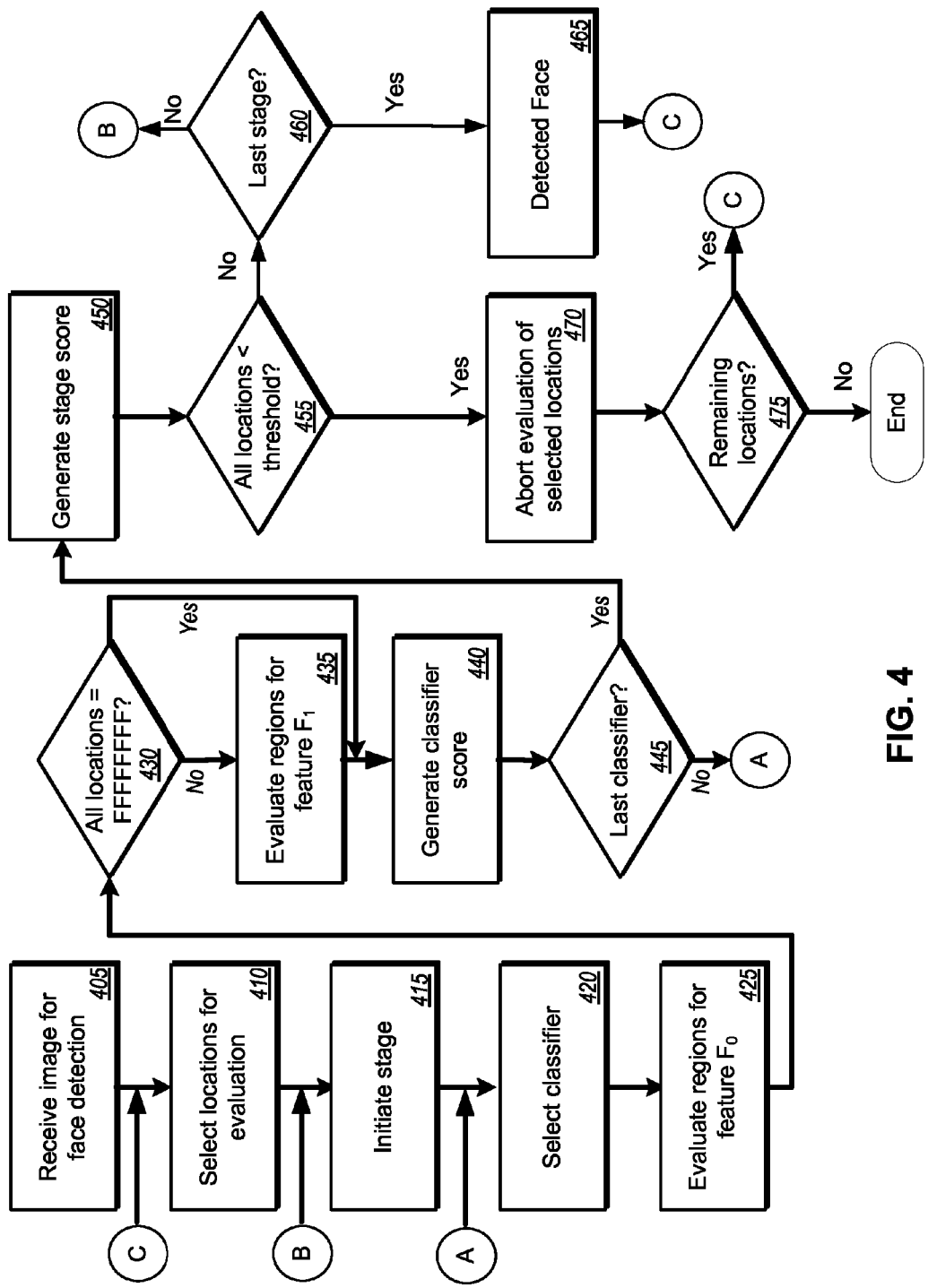
FIG. 4 shows an exemplary parallelized process for performing face detection.

FIG. 4 shows an exemplary parallelized process for performing face detection. An image for which facial detection processing is to be performed can be received (405). In some instances, user input selecting the image can be received. In other instances, the image can be selected automatically, such as in response to being generated or by virtue of its location in a particular storage device. Locations included in the image can be selected for evaluation (410). The locations can be neighboring, such as based on pixels appearing in the same row of the image. In some implementations, one or more intervening pixels can be skipped in selecting the locations. For instance, locations represented by eight pixels can be selected and every other pixel, e.g. odd pixels, can be dropped, such that only four locations are selected for evaluation. Nonetheless, any number of locations can be evaluated in parallel.

A stage of the facial detection processing can be initiated (415). If the process is beginning, the first stage of the process can be initiated. Alternatively, if one or more locations passed a preceding stage, the next stage in the process can be initiated. As discussed above with respect to FIG. 3, each stage includes a number of classifiers. A classifier included in the initiated stage can be selected (420). In some implementations, two or more of the classifiers of a stage can be evaluated in parallel. In other implementations, each of the classifiers can be evaluated serially.

The first feature, $F_0$, of the selected classifier is evaluated for each of the selected locations (425). Each of the selected locations can be identified by a pixel that serves as the origin, e.g., the upper left corner, for the feature being evaluated. A feature can have any size, e.g., 16 pixels×4 pixels. Thus, the feature can be evaluated for overlapping regions of the image. Further, the values corresponding to each of the features being evaluated can be accessed in parallel, e.g., using a vector. Thus, the feature can be evaluated in parallel for each of the regions. The resulting score for each region can be compared with the threshold for the feature. The threshold can be determined through training of the facial detection process. Each location (or region) for which the score exceeds the threshold is assigned a value of FFFFFFFF, e.g. all bits of the word are set to 1, and each location for which the score is less than or equal to the threshold is assigned a value of 0. Alternatively, the value "1" can be assigned to a location for which the score exceeds the threshold and subsequent operations involving the mask vector can be performed using multiplication. The values corresponding to the locations can be recorded in a mask for feature $F_0$. In some implementations, the mask can be structured as a vector.

After the comparisons, a determination can be made as to whether all of the locations were assigned a value of FFFFFFFF (430). If all of the locations passed the first feature of the classifier, $F_0$, the second feature, $F_1$, does not need to be evaluated. Otherwise, if at least one of the selected locations did not pass the first feature, i.e., was assigned a value of 0, the second feature, $F_1$, of the selected classifier is evaluated for each of the selected locations (435). Further, a location that passed the first feature can be masked out with respect to the second feature evaluation. The second feature, $F_1$, is evaluated in the same manner as the first feature, $F_0$. Further, a mask indicating the results of the feature analysis also is generated for $F_1$.

Once the masks have been generated for both features, or if all of the locations passed the first feature and the corresponding mask has been generated, a score can be generated for the selected classifier (440). A feature score can be associated with each possible outcome of the feature comparison.

For instance, a $Score_0$ can be associated with passing the first feature $F_0$, a $Score_1$ can be associated with passing the second feature $F_1$, and a $Score_2$ can be associated with not passing either feature included in the classifier. A predetermined value can be associated with each of the scores. For instance, $Score_0$ can equal 100 points, $Score_1$ can equal 40 points, and $Score_2$ can equal 20 points. The classifier score can be determined by multiplying the mask for $F_0$ and/or the mask for $F_1$ by the corresponding scores. In some implementations, the multiplication can be implemented using binary "and" and "or" operations. For instance, binary addition can be used to combine $Score_0$ and the mask for $F_0$; $Score_1$ and the inverse of the mask for $F_0$ and the mask for $F_1$; and $Score_2$ and the inverse of the mask for $F_0$ and the inverse of the mask for $F_1$. The resulting scores can be added to produce the classifier score corresponding to each of the selected locations.

A determination is made as to whether the selected classifier is the final classifier for the current stage (445). If the selected classifier is not the final classifier for the stage, another classifier included in the stage is selected (420). Otherwise, the stage score can be generated (450). The stage score is generated, for each of the selected locations, by combining each of the classifier scores in that stage that correspond to the selected location. The stage score for each location can then be compared with a stage threshold, which can be determined through training of the facial detection process (455). If the stage score for any of the selected locations exceeds the stage threshold, it is determined whether the current stage is the last stage (460). If the current stage is the last stage, each selected location for which the stage score exceeds the stage threshold corresponds to a detected face (465).

Otherwise, if the current stage is not the last stage, facial detection processing for the selected locations can continue and the next stage can be initiated (415). A mask identifying the one or more locations that passed the stage is generated and input to the next stage. For instance, if the second and third selected locations in a set of four passed the stage, a mask of 0110 can be generated. In some implementations, the mask can be represented as a vector. Thus, the locations that did not pass the preceding stage can be masked out for processing during the next stage. However, all of the locations in the set remain in the process until either the process completes, e.g., with a face detection, or each of the locations being evaluated has failed to pass a stage.

If the stage score for each of the selected locations is less than or equal to the threshold, the evaluation of the selected locations can be aborted (470). Further, it can be determined whether any remaining locations of the received image are to be submitted to the facial detection processing (475). If remaining locations exist, another set of locations included in the image can be selected for evaluation (410). Otherwise, the facial detection process can be terminated.

Figure 5:
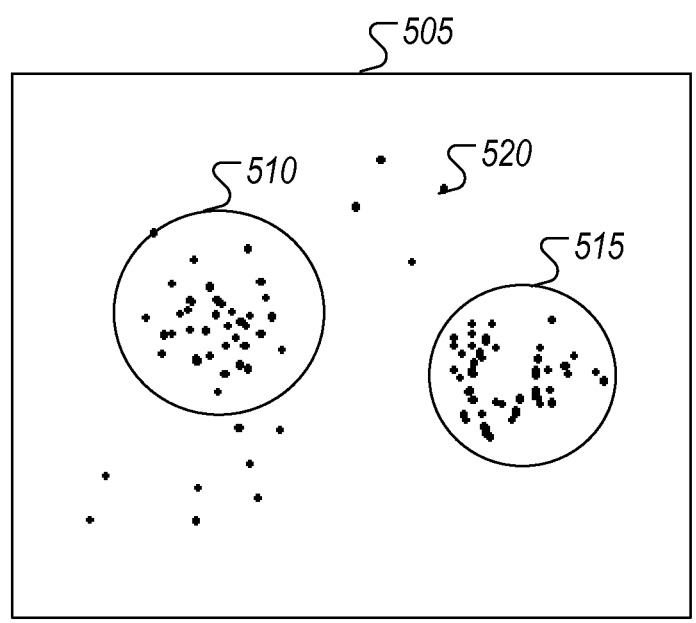
FIG. 5 shows pixel locations that successfully passed facial detection processing.

FIG. 5 shows pixel locations that successfully passed facial detection processing. Image 505 includes indicators, e.g., dots, that illustrate pixel locations for which a positive identification of a face was returned. The indicators can be displayed for results corresponding to the evaluation of a particular face size, e.g., 24 pixels×24 pixels, or for the evaluation of multiple face sizes. In image 505, indicators are included in clusters 510 and 515, which can indicate the presence of a face. Further, individual indicators, e.g., indicator 520, can be outliers that do not indicate the presence of a face. The pixel locations corresponding to the indicators can be assigned to one or more faces or discarded through a clustering process.

Figure 6:
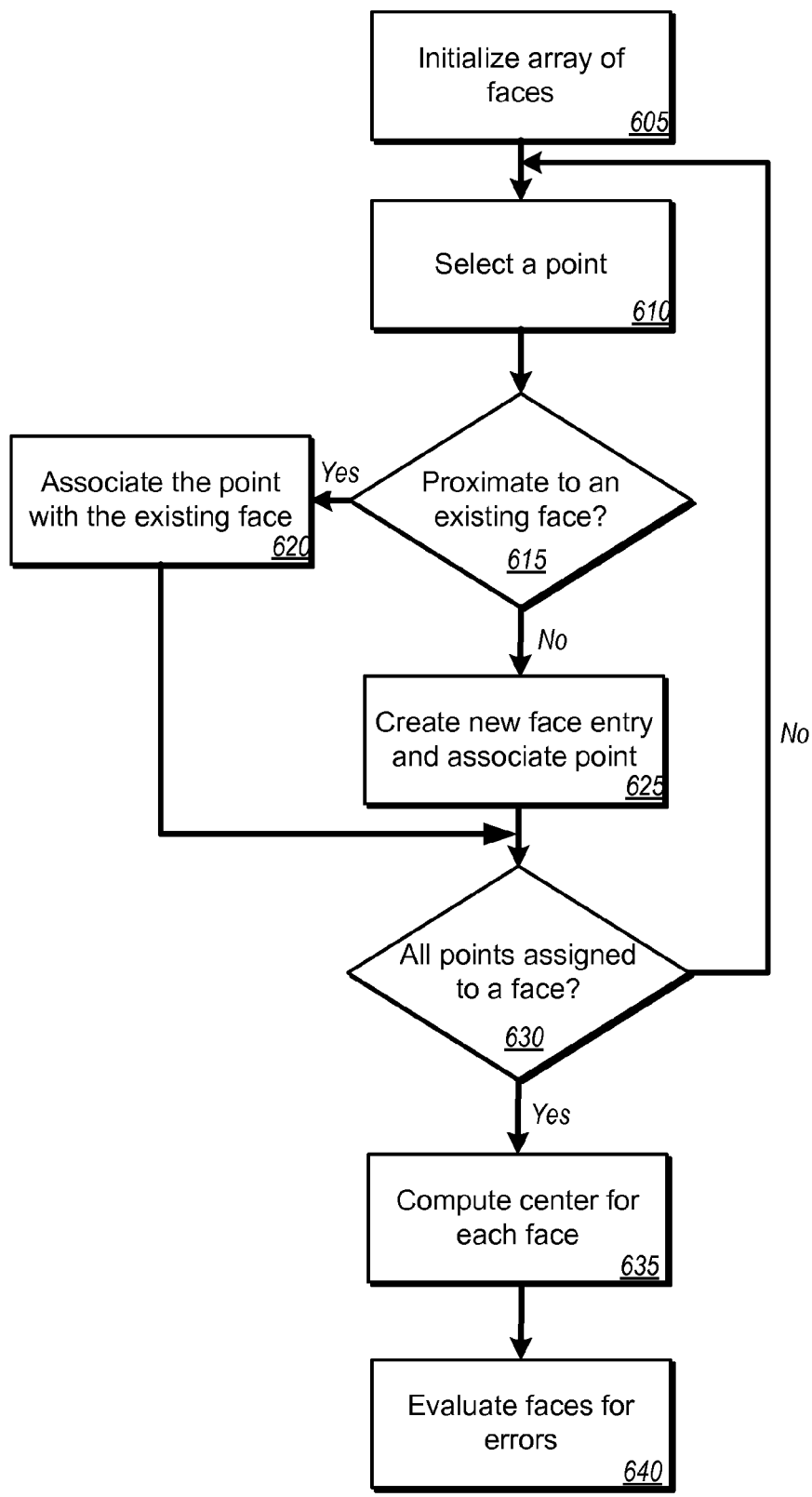
FIG. 6 shows a flow diagram of an exemplary process for clustering points that successfully passed facial detection processing.

FIG. 6 shows a flow diagram of an exemplary process for clustering points that successfully passed facial detection processing. In some implementations, the clustering process can be executed for points corresponding to a particular face size, e.g., 24 pixels×24 pixels. In some other implementations, the clustering process can be executed for points corresponding to multiple face sizes.

An array of faces can be initialized (605). The array can be empty at the beginning of the clustering process. A point that has not been assigned to a face is selected for classification (610). It is determined whether the point is within a predetermined distance of an existing face (615). For instance, the coordinates (x, y) of the point are evaluated to determine whether they are located within a predetermined distance, e.g., the dimensions of the evaluated face region, of an existing face. If the selected point is located within a predetermined distance of an existing face, the point is associated with that face. For example, the point can be added to an existing face in the array. Otherwise, if the selected point is not located within a predetermined distance of an existing face, a new face entry is created in the array and the selected point is associated with the newly created face entry (625).

Further, it can be determined whether all points have been assigned to a face (630). If unassigned points remain, one of the unassigned points is selected (610). Otherwise, all of the faces included in the array have at least one pixel that is believed to belong to it. For each face included in the array, which represents a cloud of associated points, the median of the (x, y, radius) values of the associated points is computed to define the center of the face (635).

The faces included in the array further can be analyzed for errors, such as a false positive identification (640). For instance, if two separate faces (or clusters) are determined to be overlapping in the vertical direction, the faces can be evaluated to determine whether one is a false positive that can be discarded. The radius of the higher face can be compared with the radius of the lower face. If the radius of the upper face is greater than the radius of the lower face, and the degree of overlap in the vertical direction exceeds a predetermined threshold, the lower face can be discarded as a false positive. For example, the larger upper face is presumed to be closer to the camera than the smaller lower face, and thus the lower face should be concealed by the upper face. The criteria for discarding a face can be adjusted, however, to limit the circumstances in which a detected face is determined to be a false positive. For instance, the degree of vertical overlap required to result in a false positive can be set high. This can prevent the discarding of an actual face, such as when a baby's face is held directly below an adult's face.

Figure 7:
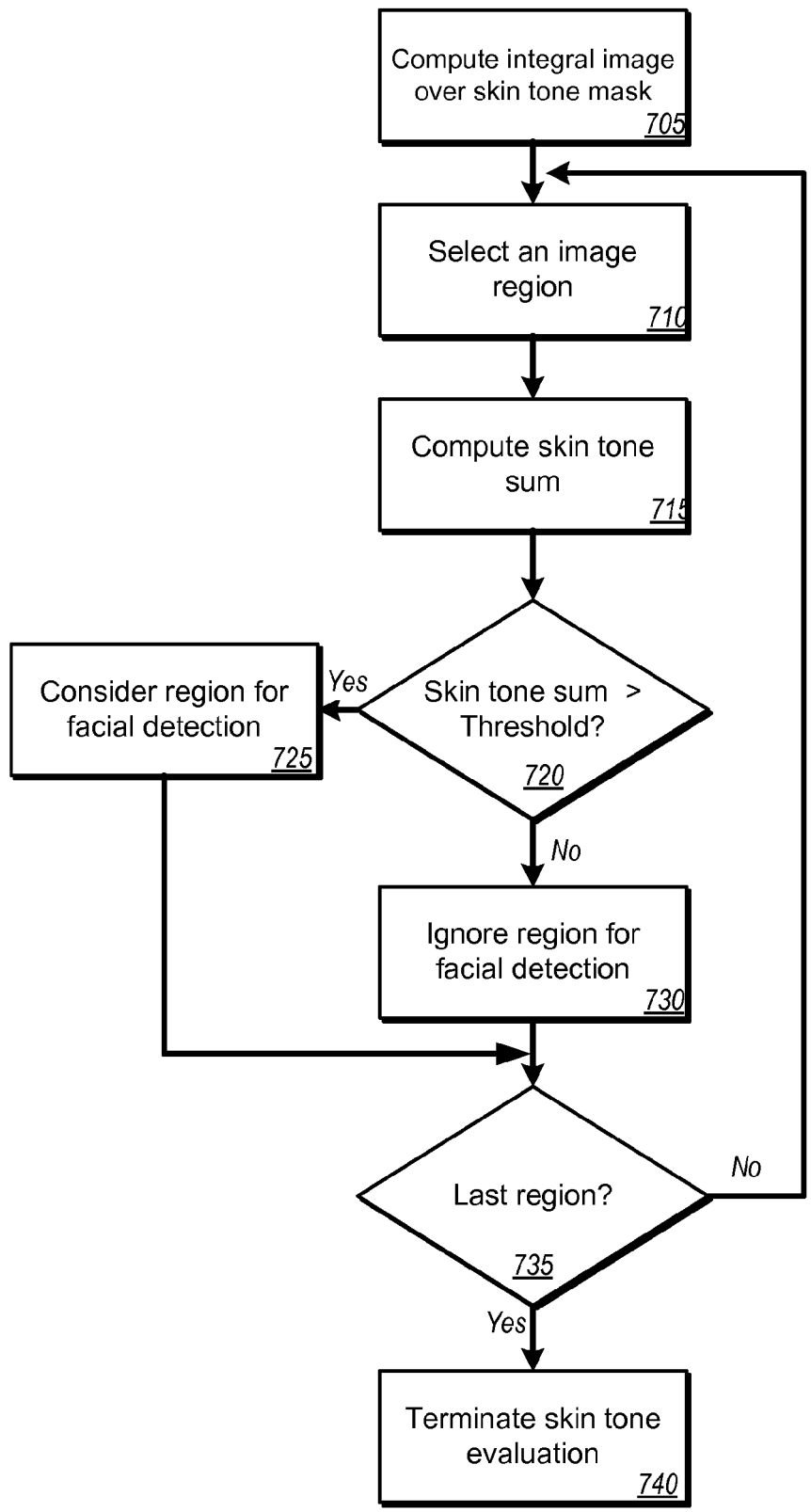
FIG. 7 shows a flow diagram of an exemplary process for identifying image regions that can be excluded from facial detection processing based on a skin tone measure.

FIG. 7 shows a flow diagram of an exemplary process for identifying image regions that can be excluded from facial detection processing based on a skin tone measure. Regions of an image that do not have a sufficient number of skin tone pixels, i.e., pixels having a value that falls within a skin tone color space, likely do not contain a depiction of a face. Therefore, regions having less than a threshold number of skin tone pixels can be excluded from facial detection processing. An integral image can be computed over a skin tone mask (705). For instance, a skin tone mask can be applied to the original image, such that each pixel having a value that falls within a predetermined skin tone color space is assigned a value of one and each pixel having a value that falls outside of the predetermined skin tone color space is assigned a value of zero. The resulting integral image indicates, for each pixel location (x, y), the number of pixels above and to the left of that pixel location that fall within the skin tone color space.

In some implementations, the skin tone color space can be defined based on an luminance, chrominance color space (y, $C_b$, $C_r$). The chrominance values ($C_b$, $C_r$) can be represented as vectors, with the area in between the vectors making up the skin tone color space. Further, the color space can be constrained (or scaled) based on the luminance value y. Thus, as the luminance value increases, the size of the skin tone color space increases. The skin tone color space also can be represented as the sum of the absolute differences of the chrominance values multiplied by the inverse luminance value. In some other implementations, any other skin tone color space can be defined using any color model.

An image region can be selected for evaluation (710). The image region can be specified as a rectangle, which can be defined by four corners. Further, the sum of skin tone pixels can be computed for the selected region (715). The sum of skin tone pixels can be determined by evaluating the integral image based on the four corners. For instance, the sum can be determined as the value of the bottom right corner−the value of the top right corner−the value of the bottom left corner+the value of the top left corner. The sum of skin tone pixels can then be compared to a threshold value (720). The threshold value can indicate the number of skin tone pixels that must be present for a face to be depicted in the selected region. For instance, the threshold value can be computed by multiplying the number of pixels in the selected region by a fraction (or percentage) of the pixels that are required to have a value in the skin tone color space. The fraction can be any amount consistent with the presence of a face in the selected region, such as 42 percent or 50 percent. In some implementations, multiple selected regions can be evaluated in parallel.

If the skin tone sum exceeds the threshold, the selected region can be considered in facial detection processing (725). For example, the selected region can be flagged for evaluation. Otherwise, the selected region can be ignored with respect to facial detection processing (730). Additionally, it can be determined whether the selected region is the last region of the image that is to be evaluated (735). If the selected region is the last region, the skin tone evaluation can be terminated (740). Otherwise, another image region can be selected (710).

In some implementations, if the skin tone sum for an immediately preceding selected region did not exceed the threshold, the selected region can be evaluated to determine whether it is mathematically possible for the threshold to be exceeded before the skin tone sum is computed. For instance, if the threshold is 50 percent, the skin tone sum of the immediately preceding selected region was 25 percent, and only 10 percent of the pixels in the presently selected region are new, the skin tone sum will not be computed for the presently selected region because the threshold cannot be exceeded. As a result, new regions can be selected without computing the skin tone sum until it is possible for the threshold to be exceeded.

Figure 8:
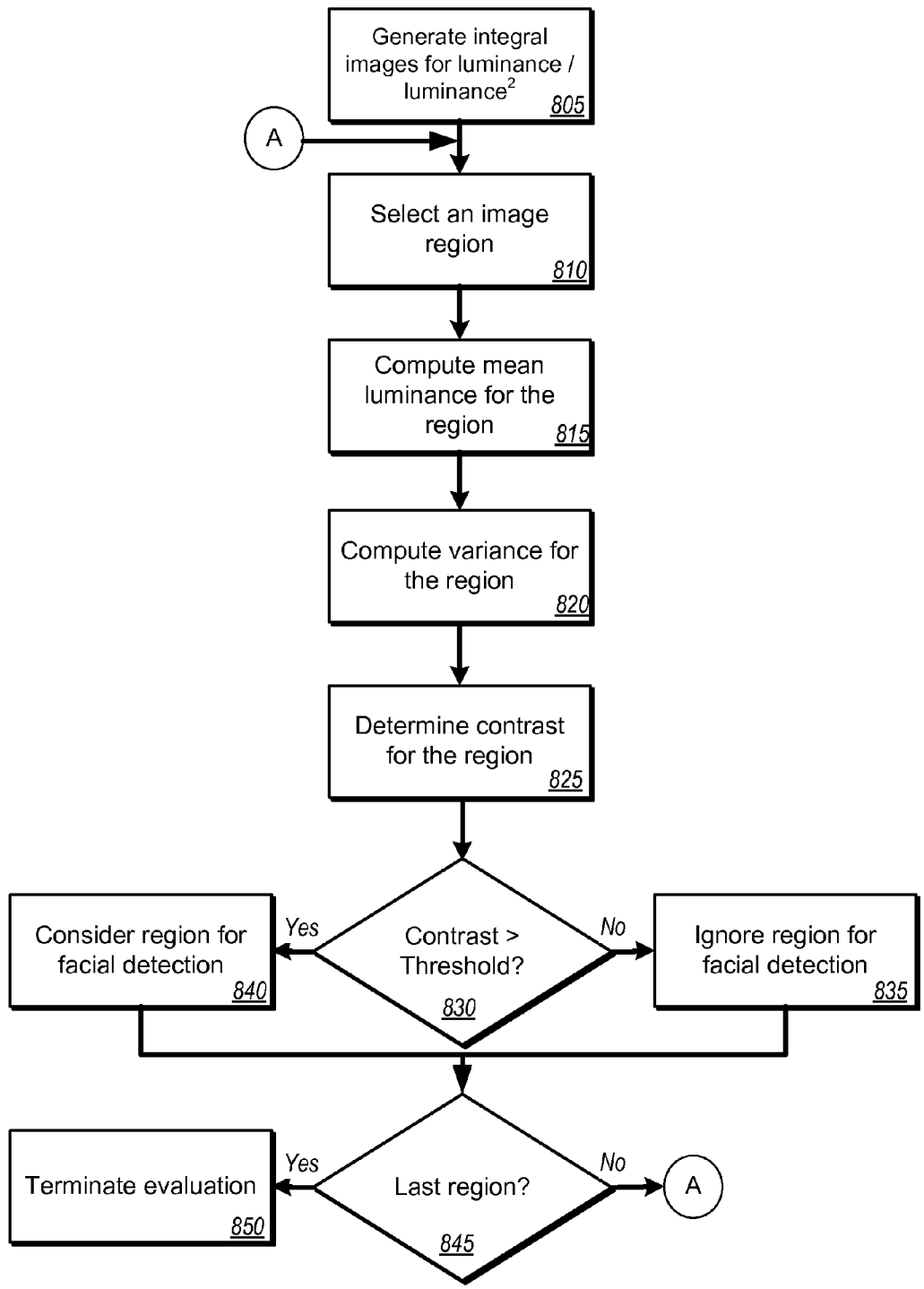
FIG. 8 shows a flow diagram of an exemplary process for identifying image regions that can be excluded from facial detection processing based on a variance measure.

FIG. 8 shows a flow diagram of an exemplary process for identifying image regions that can be excluded from facial detection processing based on a variance measure. Regions (or areas) within an image that depict relatively homogenous objects or entities, e.g., a wall or sand, are characterized by a degree of variance below that typically present in a face. Thus, one or more regions of an image can be excluded from facial detection processing because a variance measure (or factor), e.g. the variance/mean-squared, indicates that the region is unlikely to contain a depiction of a face. In some implementations, one or more regions can be evaluated individually with respect to variance, e.g. using the computed variance measure. In some other implementations, the variance associated with multiple regions can be evaluated in parallel.

Separate integral images can be generated for an original image using each of luminance and luminance-squared (805). Further, a region within the image can be selected for evaluation (810). The region can be specified as a rectangle formed by four corners, in the same manner as a feature. The process for computing a variance measure is described with respect to a single image region. However, as discussed above, multiple regions can be selected and the process can be executed in parallel for each of the multiple regions. The mean luminance for the selected region can be computed from the integral image for luminance (815). As with a feature, the mean luminance is computed by evaluating the integral image over the selected region based on a comparison of the four corners. Further, the variance for the selected region can be computed from the integral image for luminance-squared (820). The variance can be computed in the same manner as the mean luminance.

Once the mean luminance and variance have been computed, the contrast for the selected region is determined (825). To determine the contrast, the square root of the variance is computed to generate the standard deviation, which is divided by the mean luminance. The resulting contrast value can be compared to a threshold, which represents the minimum contrast that must be present for a face to be depicted in the selected region (830). If the contrast value does not exceed the threshold amount of contrast, the selected region can be ignored for face detection processing (835). Alternatively, if the contrast value exceeds the threshold, the selected region is considered for facial detection processing (840). For instance, the region can be flagged for evaluation by a facial detection processor.

Further, it can be determined whether the selected region is the last region in the image that is to be evaluated (845). If the selected region is the last region, the evaluation can be terminated (850). Otherwise, another image region can be selected (810).

Figure 9:
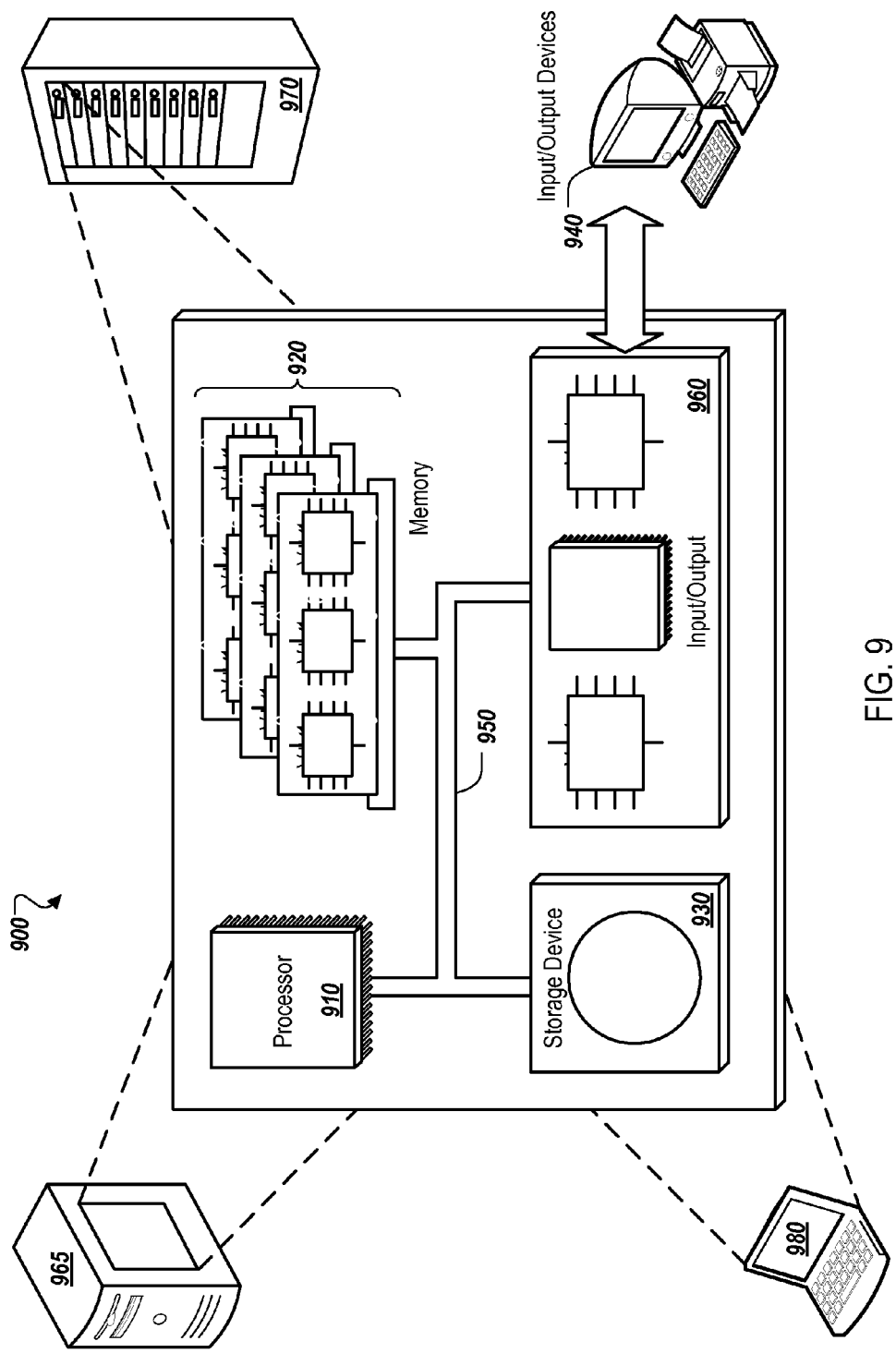
FIG. 9 shows an exemplary computing system for performing facial detection processing.

FIG. 9 shows an exemplary computing system for performing facial detection processing. Computing device 900 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations described and/or claimed in this document.

Computing device 900 includes processor 910, memory 920, storage device 930, and high-speed interface 950. Further, computing device 900 can include one or more high-speed expansion ports (not shown) and a low speed interface (not shown) connected to a low speed bus (not shown), which can interface with one or more included components, such as storage device 930. Processor 910 can be configured to process instructions for execution within computing device 900, including instructions stored in memory 920 or on storage device 930, to display graphical information for a GUI on an external input/output device, such as display 940 coupled to input/output interface 960. In other implementations, multiple processors and/or multiple buses can be used, as appropriate, along with multiple memories and types of memory. Also, multiple computing devices 900 can be connected, with each device providing one or more portions of the necessary operations (e.g., as a server bank, a group of blade servers, or a multi-processor system).

Memory 920 can be configured to store information within computing device 900. For instance, memory 920 can be a computer-readable medium, such as one or more volatile or non-volatile memory units. Storage device 930 is capable of providing mass storage for computing device 900. For instance, storage device 930 can be a computer-readable medium, such as a floppy disk device, a hard disk device, an optical disk device, a tape device, a flash memory or other similar solid state memory device, or an array of devices, including devices in a storage area network. In some implementations, a computer program product can be tangibly embodied in an information carrier. The computer program product can contain instructions that, when executed, perform one or more methods, such as those described above. The information carrier can be, e.g., a computer- or machine-readable medium, such as memory 920, storage device 930, or memory on processor 910.

A high speed controller can be configured to manage bandwidth-intensive operations for computing device 900, while a low speed controller can be configured to manage less bandwidth-intensive operations. Such allocation of duties is exemplary only. In some implementations, the high-speed controller is coupled to memory 920, display 940 (e.g., through a graphics processor or accelerator), and to high-speed expansion ports (not shown), which can accept various expansion cards (not shown). Further, the low-speed controller (not shown) can be coupled to storage device 930 and one or more low-speed expansion ports (not shown). A low-speed expansion port can be one of various communication ports (e.g., USB, Bluetooth, Ethernet, wireless Ethernet) and further can be coupled to one or more input/output devices, such as a keyboard, a pointing device, a scanner, or a networking device such as a switch or router, e.g., through a network adapter.

Computing device 900 can be implemented in a number of different forms, as shown in FIG. 9. For example, it can be implemented as server 965 or as several of such servers. Computing device 900 also can be implemented as one or more portions of rack server system 970. Additionally or alternatively, computing device 900 can be implemented as a personal computer, such as laptop computer 980.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium, which can be a machine-readable storage device, a machine-readable storage substrate, a memory device, a composition of matter effecting a machine-readable propagated signal, or any combination thereof.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or any combination thereof.

A computer program (also referred to as a program, software, software application, script, or code) can be written in any form of programming language, including compiled or interpreted languages, or declarative or procedural languages, and can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows also can be performed by, and apparatus also can be implemented as, special purpose logic circuitry, e.g., an FPGA (field programmable gate array), PLD (programmable logic device) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory, a random access memory, or both. A computer includes a processor for performing instructions and one or more memory devices for storing instructions and data. Generally, a computer also will include, or be operatively coupled to receive data from or transfer data to, or both, one or more mass storage devices for storing data, e.g., magnetic, magneto-optical, or optical disks. However, a computer need not have such devices. Moreover, a computer can be embedded in another device.

Computer-readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. Further, the processor and memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display), or OLED (organic light emitting diode) monitor, for displaying information to the user and a keyboard, and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of one or more computer programs running on the respective computers.

While this disclosure contains specific implementations, these should not be construed as limitations on the scope of any claims, but rather as descriptions of features that may be specific to particular exemplary implementations. Certain features that are described in the context of separate embodiments also can be implemented in combination in a single embodiment. Conversely, various features that are described in the context of a single embodiment also can be implemented separately in multiple embodiments or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing can be advantageous. Moreover, the separation of various system components in the embodiments described above should not be understood as requiring such separation in all embodiments and it should be understood that the described program components and systems can generally be integrated together in a single software product or packaged into multiple software products.

Only a few implementations and examples are described, and other implementations, enhancements, and variations can be made based on what is described and illustrated in this disclosure.

What is claimed is:

1. A computer-implemented method of performing face detection using parallel analysis, the method comprising:
    selecting, using a processor, a plurality of locations within an image;
    determining, for each selected location in parallel, a classifier score for each of a plurality of classifiers associated with an analysis stage;
    combining, for each selected location, the classifier scores for the plurality of classifiers to generate a total classifier score associated with the analysis stage;
    comparing, for each selected location, the total classifier score to a threshold; and
    generating a classifier mask based on the comparison of the total classifier score and the threshold for each of the selected locations.

2. The computer-implemented method of claim 1, wherein the image comprises an integral image.

3. The computer-implemented method of claim 1, wherein at least one of the plurality of classifiers includes two or more features.

4. The computer-implemented method of claim 1, further comprising:
    providing the classifier mask as an input to a subsequent analysis stage.

5. A computer-readable storage device comprising non-transitory storage medium encoding instructions that, when executed by a processing apparatus, cause the processing apparatus to perform operations comprising:
    selecting a plurality of locations within an image;
    determining, for each selected location in parallel, a classifier score for each of a plurality of classifiers associated with an analysis stage;
    combining, for each selected location, the classifier scores for the plurality of classifiers to generate a total classifier score associated with the analysis stage;
    comparing, for each selected location, the total classifier score to a threshold; and
    generating a classifier mask based on the comparison of the total classifier score and the threshold for each of the selected locations.

6. The computer-readable storage device of claim 5, further comprising instructions that, when executed by a processing apparatus, cause the processing apparatus to perform operations comprising:
    foregoing evaluation of a particular location in a subsequent analysis stage when the classifier mask includes a first value corresponding to the particular location.

7. The computer-readable storage device of claim 5, further comprising instructions that, when executed by a processing apparatus, cause the processing apparatus to perform operations comprising:
    determining that the classifier mask includes at least one second value; and providing the classifier mask as an input to a subsequent analysis stage.

8. The computer-readable storage device of claim 7, further comprising instructions that, when executed by a processing apparatus, cause the processing apparatus to perform operations comprising:
initiating the subsequent analysis stage in response to the provided classifier mask;
generating, for each location having a corresponding value in the provided classifier mask equal to the second value, a second total classifier score for a plurality of classifiers associated with the subsequent analysis stage;
comparing the generated second total classifier score for each of the corresponding locations to a second threshold associated with the subsequent analysis stage; and
modifying the provided classifier mask for locations having a corresponding value in the provided classifier mask equal to the second value based on the comparison of the generated second total classifier score to the second threshold.

9. The computer-readable storage device of claim 5, further comprising instructions that, when executed by a processing apparatus, cause the processing apparatus to perform operations comprising:
selecting the plurality of locations such that neighboring locations are separated by at least one intervening pixel location.

10. The computer-readable storage device of claim 5, wherein the threshold is determined through training.

11. The computer-readable storage device of claim 5, wherein each of the plurality of locations corresponds to a pixel of the image.

12. The computer-readable storage device of claim 5, wherein each of the plurality of locations represents an origin of a corresponding two-dimensional region.

13. The computer-readable storage device of claim 12, wherein each of the plurality of two-dimensional regions is at least partially overlapping with at least one other two-dimensional region.

14. A system comprising:
a storage device tangibly storing an image; and
processor electronics configured to perform operations comprising:
selecting a plurality of locations within an image;
determining, for each selected location in parallel, a classifier score for each of a plurality of classifiers associated with an analysis stage;
combining, for each selected location, the classifier scores for the plurality of classifiers to generate a total classifier score associated with the analysis stage;
comparing, for each selected location, the total classifier score to a threshold; and
generating a classifier mask based on the comparison of the total classifier score and the threshold for each of the selected locations.

15. The system of claim 14, wherein the image comprises an integral image.

16. The system of claim 14, wherein each of the plurality of classifiers associated with the analysis stage includes at least two features.

17. The system of claim 14, wherein the processor electronics are further configured to perform operations comprising:
determining that the classifier mask includes at least one first value; and
providing the classifier mask as an input to a subsequent analysis stage.

18. The system of claim 14, wherein the processor electronics are further configured to perform operations comprising:
selecting the plurality of locations such that each of the locations is aligned horizontally and neighboring locations are separated by at least one intervening pixel location.

* * * * *